US009828534B2

(12) United States Patent
Renkel et al.

(10) Patent No.: US 9,828,534 B2
(45) Date of Patent: Nov. 28, 2017

(54) IMPACT-MODIFIED ADHESIVES

(71) Applicant: HENKEL AG & CO. KGAA, Duesseldorf (DE)

(72) Inventors: Martin Renkel, Duesseldorf (DE); Emilie Barriau, Duesseldorf (DE); Martin Hornung, Bammental (DE); Rainer Schoenfeld, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 18 days.

(21) Appl. No.: 14/051,509

(22) Filed: Oct. 11, 2013

(65) Prior Publication Data

US 2014/0037966 A1 Feb. 6, 2014

Related U.S. Application Data

(63) Continuation of application No. PCT/EP2012/056312, filed on Apr. 5, 2012.

(30) Foreign Application Priority Data

Apr. 12, 2011 (DE) .................. 10 2011 007 187
Apr. 21, 2011 (DE) .................. 10 2011 007 897

(51) Int. Cl.
*C09J 163/00* (2006.01)
*C09J 175/04* (2006.01)
*C08L 75/04* (2006.01)
*C08L 63/00* (2006.01)
*C08G 59/40* (2006.01)
*C08G 18/40* (2006.01)
*C09J 5/06* (2006.01)
*C08J 5/24* (2006.01)
*C08J 5/04* (2006.01)
*C08K 7/14* (2006.01)

(52) U.S. Cl.
CPC ........ *C09J 163/00* (2013.01); *C08G 18/4045* (2013.01); *C08G 59/4021* (2013.01); *C08J 5/043* (2013.01); *C08J 5/24* (2013.01); *C08K 7/14* (2013.01); *C09J 5/06* (2013.01); *C09J 175/04* (2013.01); *C09J 2463/00* (2013.01); *C09J 2475/00* (2013.01); *Y10T 428/31511* (2015.04)

(58) Field of Classification Search
CPC .......... C08L 63/00–63/10; C08L 75/04; C09D 163/00–163/10; C09D 175/04; C09J 163/00–163/10; C09J 175/04; C09J 2475/00; C09J 2463/00; C08G 18/4045; C08G 59/4021
See application file for complete search history.

(56) References Cited

U.S. PATENT DOCUMENTS

| 3,158,586 | A | * | 11/1964 | Krause ................... C08G 18/10 523/455 |
| 4,578,424 | A | | 3/1986 | Goel |
| 4,613,660 | A | | 9/1986 | Goel et al. |
| 4,726,868 | A | * | 2/1988 | Goel et al. ................ 156/307.3 |
| 4,740,539 | A | * | 4/1988 | Goel ................... C08G 18/5024 523/400 |
| 5,134,216 | A | * | 7/1992 | Jansen et al. .................. 528/48 |
| 5,453,186 | A | | 9/1995 | Mueller et al. |
| 7,241,502 | B2 | | 7/2007 | Anselmann et al. |
| 2010/0130655 | A1 | * | 5/2010 | Agarwal et al. .............. 524/145 |
| 2010/0204410 | A1 | | 8/2010 | Ogawa et al. |
| 2010/0292384 | A1 | * | 11/2010 | Igarashi et al. .............. 524/425 |
| 2011/0030893 | A1 | | 2/2011 | Kramer et al. |

FOREIGN PATENT DOCUMENTS

| EP | 1469020 A1 | 10/2004 |
| JP | 6348377 A | 3/1988 |
| JP | 2007138136 A | 6/2007 |
| JP | 2007284467 A | 11/2007 |
| JP | 20116544 A | 1/2011 |
| WO | 9211240 | 7/1992 |
| WO | 9611240 A1 | 4/1996 |
| WO | 2004111136 A1 | 12/2004 |
| WO | 2006053640 A1 | 5/2006 |
| WO | 2007025007 A1 | 3/2007 |

(Continued)

OTHER PUBLICATIONS

Dow Plastics, Dow Epoxy Novolac Resins Brochure (1998).*
Scifinder properties of diglycidyl ether of bisphenol A (2015).*
Scifinder properties of CAS 2500-56-3 (2016).*
International Search Report for PCT/EP2012/056312, 2 pages.
Carrot et al., "Atom Transfer Radical Polymerization of n-Butyl Acrylate from Silica Nanoparticles," Laboratorie de Chimie Macromoleculaire Universite Pierre et Marie Curie Tour 44; 2001; pp. 4294-4301.
DIN EN ISO 527.

*Primary Examiner* — Kregg Brooks
(74) *Attorney, Agent, or Firm* — Mary K. Cameron

(57) ABSTRACT

The present application provides agents for producing an impact-modified epoxy adhesive encompassing at least two components A and B packaged separately from each other, wherein (a) component A contains at least one compound having two or more isocyanate groups together with one or more further additives, (b) component B contains at least one compound which has at least two reactive groups selected from hydroxyl groups, thiol groups, primary amino groups and secondary amino groups and is simultaneously free from epoxy groups, together with one or more further additives, (c) at least one of components A and/or B contains at least one epoxide prepolymer as an additive, (d) at least one of components A and/or B contains at least one latent hardener for epoxide prepolymers as an additive, and (e) components A and B contain no blowing agent that is capable of being heat activated.

21 Claims, No Drawings

(56) References Cited

FOREIGN PATENT DOCUMENTS

| WO | 2009017690 | A2 | 2/2009 |
| WO | 2010099281 | A1 | 9/2010 |

* cited by examiner

IMPACT-MODIFIED ADHESIVES

The present invention relates to heat-curable epoxide resin adhesives containing precursors of an impact modifier, and to a method for the production thereof. Said method involves preparing two premixes, mixing them together, and optionally allowing the mixture to pre-cure after being applied to one of the subassemblies to be joined. The pre-curing mechanism is based on a polymerization reaction of reactive cyanate resins; the polymer network that forms in situ modifies the impact strength of the subsequent adhesive. Final curing to form an adhesive takes place subsequently on heating, based on the heat-induced curing reaction of epoxide resin prepolymers.

Epoxide-based resin systems have long been successfully used as adhesives or repair materials for consumers, DIY enthusiasts and tradespeople and as adhesives, sealants or surface coatings in the aviation, automotive and electronics industry or used as resin systems with a range of different materials for producing composite materials. Curable formulations containing epoxide/hardener mixtures are suitable in particular as structural adhesives. An important property of the uncured resin system is its viscosity, which is important for handling and processability. Important material properties of the cured formulations include inter alia adhesive strength (often determined as tensile shear strength), modulus of elasticity, ultimate elongation and impact peel strength. Particularly high standards are set for adhesives which hold together essential components of a vehicle and which must not fail, even in an accident situation. Such adhesives ideally have such adhesive power and such impact strength that the adhesively bonded metallic subassemblies, for example, are deformed by the impact whereas the bonded joint sustains only minor damage and no brittle fracture occurs.

In order to optimize said properties, the addition of various classes of compounds has already been described in the prior art.

Thus, for example, WO 2007/025007 discloses the addition of rubber particles having a core-shell structure along with a further impact modifier or toughener to an epoxide resin mixture. Polyurethanes deriving from hydroxyl-terminated polyoxyalkylenes, such as for example polypropylene glycol or polytetrahydrofuran diol, are mentioned for example as impact modifiers.

WO 2009/017690 describes curable adhesive compositions based on epoxide resin; in one embodiment the compositions contain at least one epoxide resin and at least one polyurethane.

Nevertheless, the methods that are already known from the prior art for improving the material properties of the cured systems are not yet able completely to satisfy all requirements. In particular, the impact modifiers known from the prior art typically increase the viscosity of the application preparations, such that processing is more difficult (application at elevated temperatures and/or under high pressures). There was therefore still a need to develop techniques that enable the mechanical properties to be optimized and are distinguished by an improved handling ability.

The present invention proposes a solution to this problem. Instead of or in addition to the impact modifiers of the prior art, in the adhesive systems according to the invention a polymer network, preferably a polyurethane network, is formed in situ during the pre-curing reaction. This approach not only improves the impact peel strength of the resulting epoxy adhesive but at the same time allows the adhesive pre-mixes to be formulated with a low viscosity and consequently to be processed easily using conventional techniques. Moreover, the systems according to the invention are distinguished by an improved wash-out resistance during pretreatment and painting of the joined parts, in particular the vehicle body in automotive construction.

By virtue of their particular properties, the adhesives according to the invention are suitable in particular as adhesives for structural adhesive bonds, in particular in automotive and aircraft construction. The adhesive systems according to the invention allow for an adequate transmission of force between the joined subassemblies along with adequate flexibility of the adhesive bond, thus ensuring the stability and/or functionality of the resulting subassemblies.

Therefore, the present invention firstly provides an agent for producing an impact-modified epoxy adhesive encompassing at least two components A and B packaged separately from each other, wherein (a) component A contains at least one compound having two or more isocyanate groups together with one or more further additives, (b) component B contains at least one compound which has at least two reactive groups selected from hydroxyl groups, thiol groups, primary amino groups and secondary amino groups and is simultaneously free from epoxy groups, together with one or more further additives, (c) at least one of components A or B contains at least one epoxide prepolymer as an additive, (d) at least one of components A or B contains at least one latent hardener for epoxide prepolymers as an additive, and (e) components A and B contain no blowing agent that is capable of being heat activated.

It is possible in principle for the agents according to the invention to have two or more, for example three, components. According to the invention it is preferable, however, to package the agent according to the invention as a two-component agent.

According to the invention "resulting application preparation" is understood to mean any form of the mixture of components A and B of said two-component agent.

All stated molecular weight averages in the context of the present application are understood to be weight-average molecular weight ($M_w$), which is determined by gel permeation chromatography (GPC) using polystyrene as the standard.

As the first substantial constituent component A of the agents according to the invention contains at least one compound having two or more isocyanate groups.

The difunctional isocyanates (diisocyanates), trifunctional isocyanates (triisocyanates) and/or polyisocyanates known for adhesive applications are suitable in particular as the "compound having two or more isocyanate groups" within the meaning of the present invention. "Polyisocyanates" are understood according to the invention to be compounds having more than three isocyanate groups. Compounds having two or more isocyanate groups per molecule are particularly preferred according to the invention.

In addition to the monomeric di-, tri- and/or polyisocyanates, the oligomeric and/or polymeric di-, tri- and/or polyisocyanates (reactive prepolymers) are also included among the "isocyanates" that are preferred according to the invention. An "oligomer" is understood according to the invention to be a compound having fewer than 4 repeating units. Correspondingly, a "polymer" is understood to be a compound having 4 or more repeating units. It has proved particularly preferable to use mixtures of compounds having two or more isocyanate groups, such as mixtures of oligomers for example.

Examples of suitable monomeric di-, tri- or polyisocyanates are 1,5-naphthylene diisocyanate, 2,2'-, 2,4- and/or 4,4'-diphenylmethane diisocyanate (MDI), hydrogenated MDI (H12MDI), allophanates of MDI, xylylene diisocyanate (XDI), tetramethyl xylylene diisocyanate (TMXDI), 4,4'-diphenyldimethyl methane diisocyanate, di- and tetraalkylene diphenylmethane diisocyanate, 4,4'-dibenzyl diisocyanate, 1,3-phenylene diisocyanate, 1,4-phenylene diisocyanate, isomers of toluoylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HU), dicyclohexyl methane diisocyanate, cyclohexane-1,4-diisocyanate, ethylene diisocyanate, phthalic acid bis-isocyanatoethyl ester, trimethyl hexamethylene diisocyanate, 1,4-diisocyanatobutane, 1,12-diisocyanatododecane, dimer fatty acid diisocyanate. Aliphatic isocyanates such as hexamethylene diisocyanate, undecane-, dodecamethylene diisocyanate, 2,2,4-trimethylhexane-2,3,3-trimethyl hexamethylene, 1,3- or 1,4-cyclohexane diisocyanate, 1,3- or 1,4-tetramethyl xylene diisocyanate, isophorone diisocyanate, 4,4-dicyclohexylmethane/lysine ester diisocyanate or tetramethyl xylylene diisocyanate (TMXDI) are particularly suitable. Within this group the aliphatic diisocyanates can be particularly preferred.

Difunctional isocyanates are preferred. At least small proportions of trifunctional isocyanates can additionally be used, however. Isocyanates that are produced by trimerization or oligomerization of diisocyanates or by reacting diisocyanates with polyfunctional compounds containing hydroxyl or amino groups are suitable as trifunctional isocyanates. Suitable isocyanates for producing trimers are the diisocyanates already mentioned above, the trimerization products of HDI, TMXDI or IPDI being particularly preferred. Also preferred according to the invention are the polymeric di-, tri- or polyisocyanates, such as in particular polymeric MDI, and mixtures of polymeric di-, tri- or polyisocyanates with monomeric di-, tri- or polyisocyanates.

Compounds having two or more isocyanate groups with a polyether structure are particularly preferred according to the invention. Derivatives of polyethylene glycol, polypropylene glycol and/or polytetrahydrofuran containing isocyanate groups are particularly preferred according to the invention. The epoxy adhesives provided with polyurethanes based on said isocyanates that are formed in situ are distinguished by a particularly advantageous combination of impact strength and dimensional stability before curing.

It has also proved advantageous for the compounds having two or more isocyanate groups to have an average molecular weight of less than 5000 g/mol, in particular less than 3000 g/mol. Compounds having two or more isocyanate groups with an average molecular weight of more than 150 g/mol, in particular more than 250 g/mol, are likewise preferred.

Compounds having two or more isocyanate groups with an isocyanate equivalent weight from 80 g/eq to 2000 g/eq, in particular from 125 g/eq to 1000 g/eq, have proved to be preferable according to the invention in terms of their reactivity.

The agents of the present invention preferably contain the at least one compound having two or more isocyanate groups in an amount from 2 to 70 wt. %, in particular from 5 to 50 wt. %, relative in each case to the resulting application preparation comprising components A and B.

Component A of the agents according to the invention contains the compound(s) having two or more isocyanate groups together with one or more additives. According to the invention an "additive" is understood to mean a further constituent that is packaged together with the isocyanate group-containing compound. According to the invention the nature of the further constituent is unimportant, i.e. the additive can for example be a further active ingredient, such as a hardener or an epoxide prepolymer for example, a pure filler or a compound that improves the storage stability of the isocyanate compound.

It is moreover substantial according to the invention for component B of the agent according to the invention to contain at least one compound which has at least two reactive groups selected from hydroxyl groups, thiol groups, primary amino groups and secondary amino groups and is simultaneously free from epoxy groups.

Compounds are "free from epoxy groups" according to the invention if they contain no epoxy groups in the molecule. As part of the work carried out in support of this invention it has been found that the function of the compound having at least two reactive groups selected from hydroxyl groups, thiol groups, primary amino groups and secondary amino groups cannot be assumed by epoxide prepolymers also having a corresponding number of hydroxyl groups. Through the additional presence of the compounds that are substantial to the invention it is possible according to the invention to adjust the impact strength and the dimensional stability of the resulting adhesive agent in an optimal manner.

Compounds having at least two reactive groups selected from hydroxyl groups and/or thiol groups are preferred according to the invention. Reactive —OH groups are most particularly preferred according to the invention. Correspondingly, it can be preferable for component B to contain at least one diol and/or polyol, preferably at least one polyol.

It is particularly preferable according to the invention for component B to contain at least one compound which has at least two reactive hydroxyl groups and is simultaneously free from epoxy groups, together with one or more further additives.

The polyols known from polyurethane technology having an average molecular weight of up to 50,000 g/mol can be selected as diols or polyols. They can be selected for example on the basis of polyethers, polyesters, polyolefins, polyacrylates or polyamides, wherein said polymers must additionally contain OH groups. Di- or trifunctional polyethylene polyether polyols are suitable for example.

Suitable polyether polyols are for example linear or branched polyethers having a plurality of ether bonds and containing at least two alcohol groups, preferably at the chain ends. They substantially contain no functional groups other than the OH groups. Such polyether polyols are formed as reaction products of low-molecular-weight polyfunctional alcohols with alkylene oxides. The alkylene oxides preferably have 2 to 4 C atoms. The reaction products of ethylene oxide, propylene oxide, butylene oxide or mixtures thereof with aliphatic diols, such as ethylene glycol, 1,2-propanediol, 1,3-propanediol, the isomeric butanediols, such as 1,2-butanediol, 1,3-butanediol, 1,4-butanediol and 2,3-butanediol, pentanediols and hexanediols, 2,2-dimethyl-1,3-propanediol, 2-methyl propanediol, polyglycerol, 1,6- hexanediol, 2,4,4-trimethyl hexanediol-1,6,2,2,4-trimethyl hexanediol-1,6,1,4-cyclohexane dimethanol, or aromatic diols, such as 4,4'-dihydroxydiphenylpropane, bisphenol A, bisphenol F, pyrocatechol, resorcinol, hydroquinone or mixtures of two or more thereof are suitable for example. Further polyols that are suitable within the context of the invention are formed by polymerization of tetrahydrofuran (poly-THF). The reaction products of polyfunctional alcohols such as glycerol, trimethylolethane or trimethylolpropane, pentaerythritol or sugar alcohols with the alkylene oxides are moreover also suitable. They have the same number of terminal OH groups as the starting alcohol.

Polyester polyols can also be used in place of or together with the polyether polyols. They are formed by a polycondensation reaction of a polyhydric alcohol having for example 2 to 15 C atoms and preferably 2 or 3 OH groups with one or more polycarboxylic acids, preferably those having 2 to 14 C atoms (including the C atoms in the carboxyl groups) and having 2 to 6 carboxyl groups. Dicarboxylic acids are preferred here that together with diols lead to linear polyester diols or together with triols lead to branched polyester triols. Conversely, branched polyester triols can also be obtained by reacting a diol with a tricarboxylic acid. The following, for example, can be used as the alcohol component of the polyester polyol: ethylene glycol, 1,2-propanediol, 1,3-propanediol, the isomeric butanediols, pentanediols, hexanediols, 2,2-dimethyl-1,3-propanediol, 2-methyl propanediol, 1,6-hexanediol, 2,4,4-trimethyl hexanediol-1,6,2,2,4-trimethyl hexanediol-1,6, cyclohexanediol-1,4, 1,4-cyclohexane dimethanol, or aromatic diols, such as 4,4'-dihydroxydiphenyl propane, bisphenol A, bisphenol F, pyrocatechol, resorcinol, hydroquinone. Suitable carboxylic acids are for example: phthalic acid, isophthalic acid, terephthalic acid, maleic acid, dodecyl maleic acid, octadecenyl maleic acid, fumaric acid, aconitic acid, 1,2,4-benzene tricarboxylic acid, 1,2,3-propane tricarboxylic acid, malonic acid, succinic acid, glutaric acid, adipic acid, pimelic acid, sebacic acid, cyclohexane-1,2-dicarboxylic acid, 1,4-cyclohexadiene-1,2-dicarboxylic acid and others. In place of the carboxylic acids, anhydrides thereof can also be used.

By virtue of the crosslinking characteristics that are particularly suitable for the application according to the invention, it is preferable to use diisocyanates in combination with trifunctional polyols and/or aliphatic diols. Polyethylene polyether polyols and/or butanediols, in particular 1,4-butanediol, can be most particularly preferred representatives of the group of dials or polyols.

In a preferred embodiment of the present invention it has proved advantageous for the compound which has at least two reactive groups selected from hydroxyl groups, thiol groups, primary amino groups and secondary amino groups and is simultaneously free from epoxy groups to have a polyether structure. These are for example the corresponding derivatives of polyethylene glycol, polypropylene glycol and/or polytetrahydrofuran. The hydroxyl-terminated derivatives of polyethylene glycol, polypropylene glycol and/or polytetrahydrofuran are most particularly preferred according to the invention. The group of alkyl dials such as for example butanediol and hexanediol has moreover proved most particularly preferable according to the invention. These preferred polyols and dials have a particularly advantageous influence on the impact strength of the resulting adhesives.

It has moreover proved advantageous for the compound which has at least two reactive groups selected from hydroxyl groups, thiol groups, primary amino groups and secondary amino groups and is simultaneously free from epoxy groups to have a molecular weight average of less than 4000 g/mol, preferably less than 2000 g/mol. Compounds which have at least two reactive groups selected from hydroxyl groups, thiol groups, primary amino groups and secondary amino groups and are simultaneously free from epoxy groups and have an average molecular weight of at least 60 g/mol, in particular at least 90 g/mol, are particularly preferred according to the invention.

According to the invention the ratio of isocyanate equivalent weight to hydroxyl equivalent weight is preferably in the range from 1:5 to 1:1.

The agents of the present invention preferably contain the compounds which have at least two reactive groups selected from hydroxyl groups, thiol groups, primary amino groups and secondary amino groups and are simultaneously free from epoxy groups in an amount from 0.5 to 60 wt. %, in particular from 1.5 to 35 wt. %, relative in each case to the resulting application preparation comprising components A and B.

It can furthermore be preferable for the agents according to the invention to contain one or more dials and/or polyols in an amount from 0.5 to 60 wt. %, in particular from 1.5 to 35 wt. %, relative in each case to the resulting application preparation comprising components A and B.

Component B of the agents according to the invention contains the compound(s) which have at least two reactive groups selected from hydroxyl groups, thiol groups, primary amino groups and secondary amino groups and are simultaneously free from epoxy groups, together with one or more additives. According to the invention an "additive" is understood to mean a further constituent that is packaged together with the OH, SH or NH group-containing compound. According to the invention the nature of the further constituent is unimportant, i.e. the additive can for example be a further active ingredient, such as a hardener or an epoxide prepolymer for example, a pure filler or a compound that improves the storage stability of component B.

As the third substantial constituent at least one of components A and/or B contains at least one epoxide prepolymer as an additive.

The epoxide prepolymers, also referred to below as "epoxide resins", can in principle be saturated, unsaturated, cyclic or acyclic, aliphatic, alicyclic, aromatic or heterocyclic polyepoxide compounds.

Suitable epoxide resins are selected for example from epoxide resins of the bisphenol A type, epoxide resins of the bisphenol S type, epoxide resins of the bisphenol F type, epoxide resins of the phenol-novolak type, epoxide resins of the cresol-novolak type, epoxidized products of numerous dicyclopentadiene-modified phenolic resins, obtainable by reacting dicyclopentadiene with numerous phenols, epoxidized products of 2,2',6,6'-tetramethylbiphenol, aromatic epoxide resins such as epoxide resins having a naphthalene framework and epoxide resins having a fluorene framework, aliphatic epoxide resins such as neopentyl glycol diglycidyl ether and 1,6-hexanediol diglycidyl ether, alicyclic epoxide resins such as 3,4-epoxycyclohexylmethyl-3,4-epoxycyclohexane carboxylate and bis(3,4-epoxycyclohexyl)adipate and epoxide resins having a heterocyclic ring such as triglycidyl isocyanurate. In particular the epoxide resins encompass for example the reaction product of bisphenol A and epichlorohydrin, the reaction product of phenol and formaldehyde (novolak resins) and epichlorohydrin, glycidyl esters and the reaction product of epichlorohydrin and p-aminophenol.

Further polyphenols that yield suitable epoxide resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane and 1,5-hydroxynaphthalene.

Further suitable epoxide prepolymers are polyglycidyl ethers of polyalcohols or diamines. Such polyglycidyl ethers derive from polyalcohols, such as for example ethylene glycol, diethylene glycol, triethylene glycol, 1,2-propylene glycol, 1,4-butylene glycol, triethylene glycol, 1,5-pentanediol, 1,6-hexanediol or trimethylolpropane.

Further preferred epoxide resins that are commercially available encompass in particular octadecylene oxide, epichlorohydrin, styrene oxide, vinyl cyclohexene oxide, glycidol, glycidyl methacrylate, diglycidyl ethers of Bisphenol A (e.g. those that are obtainable under the trade names "Epon 828", "Epon 825", "Epon 1004" and "Epon 1010" from Hexion Specialty Chemicals Inc., "DER-331", "DER-332", "DER-334", "DER-671", "DER-732" and "DER-736" from Dow Chemical Co.), vinyl cyclohexene dioxide, 3,4-epoxycyclohexylmethyl-3,4-epoxycyclohexene carboxylate, 3,4-epoxy-6-methylcyclohexylmethyl-3,4-epoxy-6-methyl cyclohexene carboxylate, bis(3,4-epoxy-6-methylcyclohexylmethyl) adipate, bis(2,3-epoxycyclopentyl)ether, aliphatic, polypropylene glycol-modified epoxide, dipentene dioxide, epoxidized polybutadiene (e.g. cresol products from Sartomer), silicone resin containing epoxide functionalities, flame-retardant epoxide resins (e.g. "DER-580", a brominated epoxide resin of the bisphenol type, obtainable from Dow Chemical Co.), 1,4-butanediol diglycidyl ethers of a phenol-formaldehyde novolak (e.g. "DEN-431" and "DEN-438" from Dow Chemical Co.), and resorcinol diglycidyl ethers (e.g. "Kopoxite" from Koppers Company Inc.), bis(3,4-epoxycyclohexyl) adipate, 2-(3,4-epoxycyclohexyl-5,5-spiro-3,4-epoxy)cyclohexane metadioxane, vinyl cyclohexene monoxide, 1,2-epoxyhexadecane, alkyl glycidyl ethers such as for example C8-C10 alkyl glycidyl ethers (e.g. "HELOXY Modifier 7" from Hexion Specialty Chemicals Inc.), C12-C14 alkyl glycidyl ethers (e.g. "HELOXY Modifier 8" from Hexion Specialty Chemicals Inc.), butyl glycidyl ethers (e.g. "HELOXY Modifier 61" from Hexion Specialty Chemicals Inc.), cresyl glycidyl ethers (e.g. "HELOXY Modifier 62" from Hexion Specialty Chemicals Inc.), p-tert-butylphenyl glycidyl ethers (e.g. "HELOXY Modifier 65" from Hexion Specialty Chemicals Inc.), polyfunctional glycidyl ethers such as for example diglycidyl ethers of 1,4-butanediol (e.g. "HELOXY Modifier 67" from Hexion Specialty Chemicals Inc.), diglycidyl ethers of neopentyl glycol (e.g. "HELOXY Modifier 68" from Hexion Specialty Chemicals Inc.), diglycidyl ethers of cyclohexane dimethanol (e.g. "HELOXY Modifier 107" from Hexion Specialty Chemicals Inc.), trimethylolethane triglycidyl ethers (e.g. "HELOXY Modifier 44" from Hexion Specialty Chemicals Inc.), trimethylolpropane triglycidyl ethers (e.g. "HELOXY Modifier 48" from Hexion Specialty Chemicals Inc.), polyglycidyl ethers of an aliphatic polyol (e.g. "HELOXY Modifier 84" from Hexion Specialty Chemicals Inc.), polyglycol diepoxide (e.g. "HELOXY Modifier 32" from Hexion Specialty Chemicals Inc.), bisphenol F epoxides (e.g. "EPN-1138" or GY-281" from Huntsman Int. LLC), 9,9-bis-4-(2,3-epoxypropoxy)phenyl fluorenone (e.g. "Epon 1079" from Hexion Specialty Chemicals Inc.).

Further preferred commercially available compounds are selected for example from Araldite™ 6010, Araldite™ GY-281™, Araldite™ ECN-1273, Araldite™ ECN-1280, Araldite™ MY-720, RD-2 from Huntsman Int. LLC; DEN™ 432, DEN™ 438, DEN™ 485 from Dow Chemical Co., Epon™ 812, 826, 830, 834, 836, 871, 872, 1001, 1002, 1031 etc. from Hexion Specialty Chemicals Inc. and HPT™ 1071, HPT™ 1079 likewise from Hexion Specialty Chemicals Inc., as novolak resins also for example Epi-Rez™ 5132 from Hexion Specialty Chemicals Inc., ESCN-001 from Sumitomo Chemical, Quatrex 5010 from Dow Chemical Co., RE 305S from Nippon Kayaku, Epiclon™ N673 from DaiNippon Ink Chemistry or Epicote™ 152 from Hexion Specialty Chemicals Inc.

In particular the polyfunctional epoxide prepolymers such as for example the novolak resins and the derivatives of tetraphenylolethane have proved to be preferred resins according to the invention for achieving an increase in the glass transition temperature and an associated improvement in the mechanical properties.

It can moreover be preferable according to the invention to use epoxide prepolymers that are substantially free from hydroxyl groups. Epoxide prepolymers are substantially free from hydroxyl groups if they have a hydroxyl equivalent weight of at least 4000 g/eq, such as for example the product sold under the trade name DER-332.

Furthermore, at least small proportions of the following polyepoxides can additionally be used: polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimer fatty acid.

The epoxy equivalent of suitable polyepoxides can vary between 150 and 50,000, preferably between 170 and 5000. For example, an epoxide resin based on epichlorohydrin/bisphenol A that has an epoxy equivalent weight of 475 to 550 g/eq or an epoxy group content in the range from 1820 to 2110 mmol/g is suitable. The softening point determined in accordance with RPM 108-C is in the range from 75 to 85° C.

The agents according to the invention can contain at least one epoxide prepolymer that is liquid at room temperature (22° C.). This lowers the viscosity of the premix and thus makes it easier to introduce the two premixes into the mold.

It is therefore preferable for at least one of components A or B, preferably both component A and component B, to contain an epoxide prepolymer that is liquid at 22° C.

It can however also be preferable for only one of components A or B, preferably component B, to contain an epoxide prepolymer that is liquid at 22° C.

Reaction products of epichlorohydrin with bisphenol A or bisphenol F are preferably used as epoxide prepolymers that are liquid at room temperature. The epoxide resins that are liquid at room temperature generally have an epoxy equivalent weight from approximately 150 g/eq to approximately 480 g/eq. An epoxy equivalent weight range from 182 g/eq to 350 g/eq is particularly preferred.

It can likewise be preferable, however, for at least one of components A or B, preferably at least component B, to contain in addition to the epoxide prepolymer that is liquid at 22° C. an epoxide prepolymer that is solid or semi-solid at 22° C. This helps to ensure that the moldings have the necessary strength after pre-curing, and it reduces the tackiness of the moldings in comparison to moldings containing only liquid epoxide resin prepolymers.

The epoxide resins that are solid at room temperature (22° C.) are likewise obtainable from polyphenols and epichlorohydrin. Those based on bisphenol A or bisphenol F and having a melting point between 45° C. and 90° C., preferably between 50° C. and 80° C., are particularly preferred here. The latter differ from the liquid epoxide resins substantially through their higher molecular weight, which causes them to solidify at room temperature. According to the invention the solid epoxide resins have an epoxy equivalent weight of 400 g/eq. An epoxy equivalent weight from 450 g/eq to approximately 900 g/eq is particularly preferred. At 22° C., the properties of semi-solid epoxide resins are between those of solid and of liquid epoxide resins. Unlike liquid epoxide resins, they do not assume the shape of the vessel within 10 minutes under the influence of gravity and form a substantially smooth surface, but they are dimensionally stable under the influence of gravity for at least 10 minutes. They can however be deformed under manually exerted pressure without breaking, or on release of the pressure they at least approximately assume their original shape again. Semi-solid epoxide resins are therefore readily manually deformable, but not elastic.

In a most particularly preferred embodiment it has proved advantageous for only component B to contain an epoxide resin, in other words for component A to be formulated free from epoxide resins. Preparations are "free from epoxide resins" according to the invention if they contain less than 3 wt. %, preferably less than 1 wt. %, most particularly preferably less than 0.1 wt. % of an epoxide resin. Such compositions are distinguished in particular by an increased storage stability.

The agents according to the invention can optionally also contain as further epoxide prepolymers reactive thinners to adjust the flow characteristics. Reactive thinners within the meaning of this invention are low-viscosity substances (glycidyl ethers or glycidyl esters) containing epoxy groups and having an aliphatic or aromatic structure. Typical examples of reactive thinners are mono-, di- or triglycidyl ethers of $C_6$ to $C_{14}$ monoalcohols or alkyl phenols and the monoglycidyl ethers of cashew nut shell oil, diglycidyl ethers of ethylene glycol, diethylene glycol, triethylene glycol, tetraethylene glycol, propylene glycol, dipropylene glycol, tripropylene glycol, tetrapropylene glycol, neopentylene glycol, 1,4-butylene glycol, 1,5-pentanediol, 1,6-hexanediol, cyclohexane dimethanol, triglycidyl ethers of trimethylolpropane and the glycidyl esters of $C_6$ to $C_{24}$ carboxylic acids or mixtures thereof.

The agents of the present invention preferably contain the epoxide prepolymers in an amount from 20 to 90 wt. %, in particular from 40 to 80 wt. %, relative in each case to the resulting application preparation comprising components A and B.

It can be preferable according to the invention for up to 10 wt. %, in particular 0 to 5 wt. %, of the epoxide resins that are used to be reactive thinners.

It can be preferable according to the invention for the epoxide prepolymers to be incorporated entirely into component B. Alternatively, however, it can also be preferable for both component A and component B to contain epoxide prepolymers. It has proved advantageous for 10 to 90% of the entire epoxide material to be incorporated into component A and for the remaining 90 to 10% of the entire epoxide material to be incorporated into component B.

It has further proved advantageous for the resulting application preparation to have a higher proportion by weight of epoxide prepolymers than of components involved in the pre-curing mechanism.

As the fourth substantial constituent at least one of components A and/or B contains at least one latent hardener for epoxide prepolymers as an additive.

According to the invention a latent hardener (or a hardener that is capable of being heat activated) is understood to be a compound that can be stored at 22° C. together with the epoxide prepolymers without the curing reaction being started to any appreciable extent. The molecular structure of the latent hardeners changes only above 80° C., preferably above 100° C., such that above this temperature such compounds act as hardeners and start and/or accelerate the polymerization reaction of the epoxide prepolymers.

The latent hardeners can be selected from the following compounds, for example: guanidines, substituted guanidines, substituted ureas, melamine resins, guanamine derivatives, cyclic tertiary amines, aromatic amines and/or mixtures thereof. The hardeners can be incorporated stoichiometrically into the curing reaction, but they can also be catalytically active. Examples of substituted guanidines are methylguanidine, dimethylguanidine, trimethylguanidine, tetramethylguanidine, methyl isobiguanidine, dimethyl isobiguanidine, tetramethyl isobiguanidine, hexamethyl isobiguanidine, heptamethyl isobiguanidine and most particularly cyanoguanidine (dicyandiamide). Alkylated benzoguanamine resins, benzoguanamine resins or methoxymethyl ethoxymethyl benzoguanamine are mentioned as representatives of suitable guanamine derivatives. Moreover, 3,3-diaminodiphenylsulfone and 4,4-diaminodiphenylsulfone and derivatives thereof or ionic liquids (imidazolium salts), such as Baxxodur® ECX-2450 for instance, can be used as latent hardeners. The compounds known under the trade names Ancamine® 2014, Ancamine® 2337, Adeka® EH-4357 and Adeka® EH-4360 are also preferred according to the invention. Microencapsulated systems such as are sold under the trade name Novacure by Asahi Denka are also preferred according to the invention. Dicyandiamide is most particularly preferably suitable.

Phenolic hardeners such as are sold by Hexion under the trade name Durite® (in particular Durite® SD 1713 and Durite® SC-1008) are moreover particularly preferred according to the invention.

It has proved advantageous according to the invention if the latent hardener for epoxide prepolymers is contained in component B, so that an undesired reaction with the compounds having two or more isocyanate groups can be avoided.

The latent hardeners are preferably contained in the agents according to the invention in an amount from 1 to 15 wt. %, in particular from 3 to 10 wt. %, relative in each case to the resulting application preparation comprising components A and B.

In addition to the aforementioned hardeners, catalytically active substituted ureas can be used according to the invention. These are in particular p-chlorophenyl-N,N-dimethyl urea (monuron), 3-phenyl-1,1-dimethyl urea (fenuron) or 3,4-dichlorophenyl-N,N-dimethyl urea (diuron). Catalytically active tertiary acrylic or alkyl amines, such as for example benzyl dimethylamine, tris(dimethylamino)phenol, piperidine or piperidine derivatives, can also be used in principle. Furthermore, various preferably solid imidazole derivatives can be used as catalytically active accelerators. 2-Ethyl-2-methyl imidazole, N-butyl imidazole, benzimidazole and N—$C_1$ to $C_{12}$ alkyl imidazoles or N-aryl imidazoles are mentioned as representatives. Adducts of amino compounds with epoxide resins are also suitable as accelerating additives for the aforementioned hardeners. Suitable amino compounds are tertiary aliphatic, aromatic or cyclic amines. Suitable epoxy compounds are for example polyepoxides based on glycidyl ethers of bisphenol A or F or of resorcinol. Specific examples of such adducts are adducts of tertiary amines such as 2-dimethyl aminoethanol, N-substituted piperazines, N-substituted homopiperazines, N-substituted aminophenols with di- or polyglycidyl ethers of bisphenol A or F or of resorcinol.

In the context of the present invention it is preferable but not absolutely necessary for at least one of components A and B, preferably component B, additionally to contain one such curing accelerator for epoxide prepolymers, in particular adducts of amino compounds with epoxide resins.

The curing accelerators for epoxide prepolymers are preferably contained in the agents according to the invention in an amount from 0 to 5 wt. %, in particular from 0.1 to 2 wt. %, relative in each case to the resulting application preparation comprising components A and B.

It is also substantial to the invention for the agents to be packaged free from blowing agents that are capable of being heat activated. According to the invention agents are "free from blowing agents that are capable of being heat activated" if less than 0.3 wt. %, preferably 0 wt. %, of a blowing agent that is capable of being heat activated has been added to them, relative in each case to the resulting application preparation comprising components A and B.

To accelerate the pre-curing of the combined premixes with reaction of the reactive cyanate resins, preferably with polyurethane formation, it is preferable for at least one of components A and B (preferably only component B) additionally to contain a curing catalyst for isocyanates. Dialkyl tin dicarboxylates, such as for example dibutyl tin dicarboxylates, are suitable for this purpose for example. The carboxylate groups can be selected from those having in total (i.e. including the carboxyl group) 2 to 18 C atoms. Acetic acid, propionic acid, butyric acid, valeric acid, hexanoic acid, octanoic acid, decanoic acid, lauric acid, palmitic acid and stearic acid for example are suitable as carboxylic acids for forming carboxylates. Dibutyl tin dilaurate is suitable in particular. Furthermore, organometallic compounds based on bismuth and zinc such as for example bismuth zinc neodecanoate or alternatively purely organic accelerators such as dimethyl benzylamine or diazabicyclooctane can be used.

Such curing catalysts for isocyanates are preferably contained in the agents according to the invention in an amount from 0 to 3 wt. %, in particular from 0.02 to 0.5 wt. %, relative in each case to the resulting application preparation comprising components A and B.

In the context of a further preferred embodiment of the present invention, component A and/or B contain at least one filler.

As a rule the known fillers such as for example the various ground or precipitated chalks, carbon black, calcium magnesium carbonates, talc, kaolins, barytes and in particular siliceous fillers of the aluminum magnesium calcium silicate type, e.g. wollastonite, bentonite, chlorite, are preferred according to the invention. Mica-containing fillers can preferably additionally be used, a two-component filler comprising muscovite mica and quartz having a low heavy metals content being most particularly preferred here.

For the purposes of weight reduction the mixture of substances can contain lightweight fillers in addition to the aforementioned "normal" fillers. Lightweight fillers have the characterizing feature according to the invention that they have a lower density than the preparation into which they are incorporated, such that the addition thereof reduces the density of the preparation. Such lightweight fillers can be selected from the group of hollow metal beads such as for example hollow steel beads, hollow glass beads, fly ash (Fillite), hollow plastic beads based on phenolic resins, epoxide resins or polyesters, expanded hollow microbeads with wall material made from (meth)acrylic acid ester copolymers, polystyrene, styrene (meth)acrylate copolymers and in particular polyvinylidene chloride as well as copolymers of vinylidene chloride with acrylonitrile and/or (meth)acrylic acid esters, hollow ceramic beads or organic lightweight fillers of natural origin such as ground nut shells, for example the shells of cashew nuts, coconuts or peanut shells, as well as cork meal or coke powder. Lightweight fillers based on hollow microbeads, which in the cured molding matrix ensure a high compressive strength of the molding, are particularly preferred here.

In a particularly preferred embodiment the heat-curable materials additionally contain fibers, based for example on aramid fibers, carbon fibers, metal fibers, made for example from aluminum, glass fibers, polyamide fibers, polyethylene fibers or polyester fibers, these fibers preferably being pulp fibers or staple fibers having a fiber length of between 0.5 and 6 mm and a diameter of 5 to 20 µm. Polyamide fibers of the aramid fiber type or polyester fibers are particularly preferred.

The fillers (normal fillers, lightweight fillers and fibers together) are preferably contained in the agents according to the invention in an amount from 1 to 30 wt. %, in particular from 8 to 20 wt. %, relative in each case to the resulting application preparation comprising components A and B.

It has further proved advantageous for at least one of components A and/or B to contain at least one drying agent as an additive. According to the invention "drying agents" are understood to be compounds which are capable of binding liquids, preferably water. Representatives of this substance class that are preferred according to the invention are calcium oxide and/or magnesium oxide and/or zeolites.

It can be particularly preferable according to the invention for the drying agent to be packaged in component A. This avoids a decomposition of the isocyanate groups due to $CO_2$ cleavage in the presence of water and the resulting adhesive bonds have few unintended gas inclusions.

The drying agent is preferably contained in the agents according to the invention in amounts from 0.5 to 5 wt. %, in particular from 1 to 3 wt. %, relative in each case to the resulting application preparation comprising components A and B.

In a further embodiment it has proved advantageous for the agents according to the invention to contain at least one thixotropic agent, such as for example pyrogenic silica and/or pulp fibers. The addition of the thixotropic agent increases the stability of the formulations. Thus it has proved advantageous to align the viscosities of the two components A and B to one another through the selective addition of thixotropic agents. The thixotropic agent can be included in component A and/or component B. It can be preferable for both component A and component B to contain a thixotropic agent.

The thixotropic agent is preferably contained in the agents according to the invention in an amount from 0 to 8 wt. %, in particular from 0.1 to 4 wt. %, relative in each case to the resulting application preparation comprising components A and B.

In a further preferred embodiment component A and/or component B of the agents according to the invention contains at least one toughener. Such tougheners improve the fracture behavior of the preparations according to the invention and are known to the person skilled in the art in the field of epoxy adhesives. They can be selected for example from: thermoplastic isocyanates or polyurethanes, rubber particles, in particular those having a core-shell structure, and block copolymers, in particular those containing a first polymer block having a glass transition temperature of less than 15° C. and a second polymer block having a glass transition temperature of greater than 25° C. Such block copolymers are preferably selected from those in which a first polymer block is selected from a polybutadiene or polyisoprene block and a second polymer block is selected from a polystyrene or a polymethyl methacrylate block. Specific examples thereof are block copolymers having the following block structure: styrene-butadiene-(meth)acrylate, styrene-butadiene-(meth)acrylic acid ester, ethylene-(meth)acrylic acid ester-glycidyl (meth)acrylic acid ester, ethylene-(meth)acrylic acid ester-maleic anhydride, methyl methacrylate-butyl acrylate-methyl methacrylate.

Tougheners that are preferred according to the invention are furthermore rubber particles having a core-shell structure with a core made from a polymer material having a glass transition temperature of less than 0° C. and a shell made from a polymer material having a glass transition temperature of greater than 25° C. Particularly suitable rubber particles having a core-shell structure can have a core made from a diene homopolymer, a diene copolymer or a polysiloxane elastomer and/or a shell made from an alkyl (meth) acrylate homopolymer or copolymer.

For example, the core of these core-shell particles can contain a diene homopolymer or copolymer, which can be selected from a homopolymer of butadiene or isoprene, a copolymer of butadiene or isoprene with one or more ethylenically unsaturated monomers, such as for example vinyl aromatic monomers, (meth)acrylonitrile, (meth)acrylates or similar monomers. The polymer or copolymer of the shell can contain as monomers for example: (meth)acrylates, such as in particular methyl methacrylate, vinyl aromatic monomers (for example styrene), vinyl cyanides (for example acrylonitrile), unsaturated acids or anhydrides (for example acrylic acid), (meth)acrylamides and similar monomers, which lead to polymers having a suitable high glass transition temperature.

The polymer or copolymer of the shell can contain acid groups, which can crosslink by metal carboxylate formation, for example by salt formation with divalent metal cations. The polymer or copolymer of the shell can furthermore be covalently crosslinked by using monomers having two or more double bonds per molecule.

Other rubber-like polymers can be used as the core, such as for example polybutyl acrylate or polysiloxane elastomers, such as for example polydimethyl siloxane, in particular crosslinked polydimethyl siloxane.

These core-shell particles are typically constructed in such a way that the core makes up 50 to 95 wt. % of the core-shell particle and the shell makes up 5 to 50 wt. % of this particle.

These rubber particles are preferably relatively small. For example, the average particle size (determinable by light scattering methods for example) can be in the range from approximately 0.03 to approximately 2 μm, in particular in the range from approximately 0.05 to approximately 1 μm. Smaller core-shell particles can however likewise be used, for example those whose average diameter is less than approximately 500 nm, in particular less than approximately 200 nm. The average particle size can for example lie in the range from approximately 25 to approximately 200 nm.

The production of such core-shell particles is known in the prior art, as is indicated for example in WO 2007/025007 on page 6, lines 16 to 21. Commercial supply sources for such core-shell particles are listed in this document in the last paragraph of page 6 to the first paragraph of page 7. Reference is hereby made to these supply sources. Reference is moreover made to production methods for such particles, which are described in the cited document from page 7, second paragraph to page 8, first paragraph. For more information on suitable core-shell particles reference is likewise made to the cited document WO 2007/025007, which contains detailed information on this subject from page 8, line 15 to page 13, line 15.

Inorganic particles having a shell made from organic polymers can take on the same function as the aforementioned rubber particles having a core-shell structure.

In this embodiment the agent according to the invention preferably contains inorganic particles having a shell made from organic polymers, the organic polymers being selected from homopolymers or copolymers of acrylic acid and/or methacrylic add esters and containing at least 30 wt. % of acrylic acid and/or methacrylic acid esters incorporated by polymerization.

The acrylic acid and/or methacrylic acid esters are preferably methyl and/or ethyl esters, wherein at least a proportion of the esters is particularly preferably present as methyl ester. The polymers can additionally also contain unesterified acrylic and/or methacrylic acid, which can improve the binding of the organic polymers to the surface of the inorganic particles. In this case it is therefore particularly preferable for the monomer units of unesterified acrylic and/or methacrylic acid to be located at (or near to) the end of the polymer chain that binds to the surface of the inorganic particles.

It is preferable here for the organic polymers to be made up of at least 80 wt. % acrylic acid and/or methacrylic acid esters. In particular they can be made up of 90 wt. %, 95 wt. % or entirely thereof. If the organic polymers contain monomers other than said acrylic acid and/or methacrylic acid esters or unesterified acrylic acid and/or methacrylic acid, they are preferably selected from comonomers having epoxy, hydroxyl and/or carboxyl groups.

The organic polymers of the shell are preferably uncrosslinked or so weakly crosslinked that no more than 5% of monomer units of one chain are crosslinked with monomer units of another chain. It can be advantageous here for the polymers in the vicinity of the surface of the inorganic particles to be more strongly crosslinked than those further outside in the shell. In particular the shell is preferably constructed in such a way that at least 80%, in particular at least 90% and particularly preferably at least 95% of the polymer chains are bound by one end to the surface of the inorganic particles.

Before the shell of organic polymers is applied, the inorganic particles preferably have an average particle size in the range from 1 to 1000, in particular in the range from 5 to 30 nm. It is known that the particle size can be determined by light scattering methods and by electron microscopy.

The shell of organic polymers has a lower density than the inorganic particles themselves. The shell of organic polymers preferably has a thickness such that the weight ratio of the inorganic core to the shell of organic polymers is in the range from 2:1 to 1:5, preferably in the range from 3:2 to 1:3. This can be controlled by the choice of reaction conditions when growing the shell of organic polymers onto the inorganic particles.

In general the inorganic particles can be selected from metals, oxides, hydroxides, carbonates, sulfates and phosphates. Mixed forms of oxides, hydroxides and carbonates, such as for example basic carbonates or basic oxides, can also be present. If inorganic particles of metals are chosen, iron, cobalt, nickel or alloys comprising at least 50 wt. % of one of these metals are preferably suitable. Oxides, hydroxides or mixed forms thereof are preferably selected from those of silicon, cerium, cobalt, chromium, nickel, zinc, titanium, iron, yttrium, zirconium and/or aluminum. Mixed forms of these too are possible, such as for example particles of aluminosilicates or of siliceous glasses. Zinc oxide, aluminum oxides or hydroxides and $SiO_2$ and the oxide forms of silicon referred to as silica are particularly preferred. The inorganic particles can moreover consist of carbonates, such as for example calcium carbonate, or of sulfates, such as for example barium sulfate. It is naturally also possible for particles having differently constituted inorganic cores to be present side by side.

The method described in WO 2004/111136 A1 by reference to the example of coating zinc oxide with alkylene ether carboxylic acids can be used for example to produce the inorganic particles having a shell of organic polymers. According to this processing mode the untreated inorganic particles are suspended in a non-polar or scarcely polar solvent, then monomeric or prepolymeric constituents of the shell are added, the solvent is removed, and polymerization is started, radically or photochemically for example. Furthermore, it is possible to proceed in an analogous manner to the production method described in EP 1 469 020 A1, wherein monomers or prepolymers of the shell material are used as the organic coating component for the particles. Furthermore, a production of the encapsulated particles by atom transfer radical polymerization is possible, as described by way of example in relation to the polymerization of n-butyl acrylate onto silica nanoparticles in: G. Carrot, S. Diamanti, M. Manuszak, B. Charleux, J.-P. Vairon: "Atom Transfer Radical Polymerization of n-Butyl Acrylate from Silica Nanoparticles", J. Polym. Sci., Part A: Polymer Chemistry, Vol. 39, 4294-4301 (2001).

Furthermore, production methods as described in WO 2006/053640 can be used. For the present invention inorganic cores should be selected such as are described in WO 2006/053640 from page 5, line 24 to page 7, line 15 along with their production methods. The coating of these cores takes place in an analogous manner to the description given in this document from page 10, line 22 to page 15, line 7. The proposal in this document for pretreating the inorganic cores prior to application of the shell by polymerization can also be followed (page 15, lines 9 to 24). Said document states here in this regard:

"In particular where inorganic cores are used, it may also be preferable for the core to be subjected to pretreatment which enables binding of the shell before the shell is applied by polymerization. This can conventionally consist in a chemical functionalization of the particle surface, as is known from the literature for a very wide variety of inorganic materials. It may preferably involve in particular the application to the surface of such chemical functions which as a reactive chain end allow grafting of the shell polymers. Terminal double bonds, epoxy functions and polycondensable groups can be mentioned here in particular as examples. The functionalization of hydroxyl group-bearing surfaces with polymers is known for example from EP-A-337 144."

According to the invention the material contains at least one block copolymer as an additional component (e). This is preferably selected from those containing a first polymer block having a glass transition temperature of less than 15° C., in particular less than 0° C., and a second polymer block having a glass transition temperature of greater than 25° C., in particular greater than 50° C. Furthermore, block copolymers are suitable that are selected from those in which a first polymer block is selected from a polybutadiene or polyisoprene block and a second polymer block is selected from a polystyrene or a polymethyl methacrylate block.

The block copolymer (e) is selected for example from copolymers having the following block structure: styrene-butadiene-(meth)acrylate, styrene-butadiene-(meth)acrylic acid ester, ethylene-(meth)acrylic acid ester-glycidyl (meth) acrylic acid ester, ethylene-(meth)acrylic acid ester-maleic anhydride, (meth)acrylic acid ester-butyl acrylate-(meth) acrylic acid ester, preferably methyl methacrylate-butyl acrylate-methyl methacrylate.

The aforementioned block copolymers correspond to those which can also be used in the context of the already cited WO 2007/025007. More details thereof and further block copolymers that are also suitable in the context of the present invention can be taken from this document from page 25, line 21 to page 26, line 9. Cross-references to documents in which the production of such block copolymers is described can also be found there.

The composition of these block copolymers is defined above by indicating the monomer unit for each block. This should be understood to mean that the block copolymer contains polymer blocks made from the cited monomers. Up to 20 mol % of the cited monomers in the individual polymer blocks can be replaced by other comonomers. This applies in particular to blocks of polymethyl methacrylate.

The cited block copolymers improve the impact strength of the cured materials according to the invention, in particular at temperatures below 0° C.

It has been found according to the invention that the impact strength of the resulting adhesive bond can be further improved if the toughener is contained as a further additive in component A of the agents according to the invention.

The agents according to the invention preferably contain the tougheners in an amount from 0 to 40 wt. %, in particular from 5 to 20 wt. %, relative in each case to the resulting application preparation comprising components A and B.

The curable materials according to the invention can furthermore contain further common auxiliary agents and additives, such as for example plasticizers, rheology aids, wetting agents, adhesion promoters, antioxidants, stabilizers and/or colored pigments. The proportions of the individual components can vary within comparatively broad limits, depending on the requirements profile in terms of processing properties, flexibility, the required stiffening effect and the adhesive bond to the substrates.

Furthermore, one or both of the following conditions preferably applies to the composition of component A:

The percentage by weight of epoxide prepolymer, relative to the total component A, is 25 to 75 wt. %, preferably 30 to 70 wt. %;

The percentage by weight of isocyanate, relative to the total component A, is 20 to 50 wt. %, preferably 30 to 40 wt. %.

It is particularly preferable for both of these conditions to apply simultaneously. In each case, the sum of the part by weight of epoxide prepolymer, the part by weight of the compound having two or more isocyanate groups and the parts by weight of the optionally further additives of component A is 100 wt. %.

It can be preferable for component A to contain as an additive 0 to 50 wt. %, in particular 0 to 35 wt. %, of a toughener.

One or both of the following conditions preferably applies to component B:

The percentage by weight of epoxide prepolymer, relative to the total component B, is 30 to 95 wt. %, preferably 50 to 85 wt. %;

The percentage by weight of the compound which has at least two reactive groups selected from hydroxyl groups, thiol groups, primary amino groups and secondary amino groups and is simultaneously free from epoxy groups, relative to the total component B, is 1 to 30 wt. %, preferably 2.5 to 15 wt. %.

It is particularly preferable for both of these conditions to apply simultaneously. In each case, the sum of the part by weight of epoxide prepolymer, the part by weight of the compound which has at least two reactive groups selected from hydroxyl groups, thiol groups, primary amino groups and secondary amino groups and is simultaneously free from epoxy groups and the parts by weight of the optionally further additives of component B is 100 wt %.

One or both of the following conditions particularly preferably applies to component B:

The percentage by weight of epoxide prepolymer, relative to the total component B, is 30 to 95 wt. %, preferably 50 to 85 wt. %;

The percentage by weight of the compound which has at least two reactive groups selected from hydroxyl groups, thiol groups, primary amino groups and secondary amino groups, is simultaneously free from epoxy groups and is selected from polyols and diols, relative to the total component B, is 1 to 30 wt. %, preferably 2.5 to 15 wt. %.

It is particularly preferable for both of these conditions to apply simultaneously. In each case, the sum of the part by weight of epoxide prepolymer, the part by weight of the compound which has at least two reactive groups selected from hydroxyl groups, thiol groups, primary amino groups and secondary amino groups, is simultaneously free from epoxy groups and is selected from polyols and diols and the parts by weight of the optionally further additives of component B is 100 wt. %.

Component B can contain one or more, preferably all, of the following additives, relative to the total component B:
i) 0 to 30 wt. %, preferably 1 to 20 wt. %, of lightweight filler,
ii) 0 to 5 wt. %, preferably 1 to 3 wt. %, of water-binding agent such as for example calcium oxide,
iii) 2 to 25 wt. %, preferably 5 to 20 wt. %, of heat-activatable hardener for epoxides,
iv) 0.5 to 5 wt. %, preferably 1 to 3.5 wt. %, of a curing accelerator for epoxide prepolymers, in particular an adduct of amino compounds with epoxide resins,
v) 0.005 to 5 wt. %, preferably 0.02 to 0.25 wt. %, of curing accelerator for isocyanates as described above, in particular dibutyl tin dilaurate.

The mixing ratio of constituents of the two components that are liquid under normal pressure at a maximum temperature of 100° C. to constituents that are solid under said conditions is preferably chosen such that the viscosity of both component A and component B at a temperature of at most 100° C., in particular at most 80° C., is such that they are pumpable, in particular using conventional positive-displacement pumps such as piston or peristaltic pumps. According to the invention components are described as "pumpable" if under an application pressure of 0 to 300 bar, preferably 5 to 150 bar, and with a nozzle aperture of 80 mm² they allow a flow rate of 10 g/min to 10 kg/min, preferably 50 g/min to 5 kg/min. This property simplifies the further processing according to the invention of the two components. In particular, components having a viscosity of 0.01 to 1000 Pa*s at the application temperature (measurement conditions: rotary rheometer with a plate/plate geometry (PP20), shear rate 100 s-1, material coating thickness 0.2 mm) are described as "pumpable".

Preparations according to the invention are most particularly preferred that are "pumpable" in the sense that at 25° C. and under a pump pressure of 6 bar they have a flow rate of at least 10 g/min, preferably from 10 g/min to 10 kg/min, most preferably from 50 g/min to 5 kg/min, when they are discharged from a completely full commercial aluminum cartridge with a capacity of 310 ml and an internal diameter of 46 mm, the outlet of which was opened using a cartridge piercer with an external diameter of 9 mm, without attachment of a nozzle, at a temperature of 25° C. (after 45 minutes pre-heating) and under a pressure of 6 bar. The flow rate indicates the mass of preparation that can be discharged within 1 minute and is therefore stated in g/min.

The present application secondly provides a heat-curable one-component epoxy adhesive that can be obtained by mixing components A and B according to the aforementioned two-component agents and pre-curing at a temperature from 5 to 100° C.

All that has been stated in respect of the two-component agents according to the invention applies with the necessary alterations to the details of the preferred constituents of components A and B.

The two components A and B are conventionally mixed immediately before applying the epoxy adhesive to at least one of the two bonding surfaces of the subassemblies to be joined.

According to the invention "immediately before application" is understood to mean that a period of less than 60 minutes, preferably from 0.01 second to 5 minutes, elapses between mixing of the components and application of the resulting adhesive.

For example, the two components can be conveyed with pumps out of storage vessels, mixed by means of a static mixer or a dynamic mixer and applied from the mixer onto at least one of the bonding surfaces of the subassemblies to be joined. A plurality of subassemblies can be presented, onto the bonding surfaces of which the resulting application preparation is applied successively or simultaneously (if a plurality of mixers is provided).

Following mixing and application, dimensional stability is rapidly established within the resulting application preparation through the reaction of the isocyanate groups with the reactive —OH and/or —SH and/or —NH groups. The time required for this process is dependent on the temperature and can be in the range from approximately 1 minute to approximately 48 hours, for example, with pre-curing times from 5 minutes to 1 hour being preferred according to the invention. Compositions that give rise to dimensionally stable materials after being heated for a period of 10 to 20 minutes at a temperature from 80° C. to 22° C. are preferred according to the invention.

According to the invention a material is described as "dimensionally stable" if the geometry of said material does not deform under the influence of gravity at the specified temperature within 1 hour.

A deformation under pressure is however possible and can even facilitate the bringing into contact with the subassemblies to be joined.

Through the use of components A and B, which thicken only after being mixed together, it is possible according to the invention to use a simple two-component pumping system rather than the more expensive injection molding line that conventionally has to be used for the application of impact-modified adhesives.

It has proved particularly advantageous according to the invention if components A and B are mixed together in a mixing ratio of 10:1 to 1:10 parts by weight, preferably 4:1 to 1:4 parts by weight. For application from two-chamber cartridges in particular, a mixing ratio of 1:1, 1:2 or 1:4 parts by weight has proved particularly suitable.

Pre-curing takes place in a temperature range from 5° C. to 100° C. It can be preferable according to the invention if pre-curing takes place in the range from 20° C. to 75° C.

In one embodiment it can be preferable according to the invention simply to leave the resulting application preparation at ambient temperature until the spontaneous reaction between the isocyanate groups and the hydroxyl, thiol or amino groups is completed.

However, in the context of another likewise preferred embodiment, it can also be preferable actively to apply heat. This can be achieved for example by introduction of the adhesive into an oven, by irradiation with IR radiation, by heat radiation with a fan heater, by electrical heating of the parts to be joined (electrical resistance), by heating wires integrated into the adhesive layer or by heating the subassembly by induction in the region of the bonding surfaces.

It has proved particularly advantageous according to the invention if the heat-curable one-component adhesive is formed as a bead of adhesive.

According to the invention a "bead" is understood to be a three-dimensional adhesive application of any cross-section, for example of a triangular, rectangular or polygonal cross-section, but preferably of an oval to circular cross-section, and, in the case of application on a substrate, in particular of a cross-section in the shape of a segment of an oval or a circle, in consequence of the surface of the substrate. Said cross-section can be dependent in particular on the choice of application tool, such as for example on the geometry of the aperture of an application nozzle, and/or on a pressure acting on the adhesive under which the adhesive is discharged, and/or also on other influencing variables such as for example the temperature of the adhesive itself and/or the ambient temperature and/or the atmospheric humidity. A bead has a diameter, wherein within the meaning of the present invention the diameter can be understood to be a width or thickness of the adhesive extending substantially parallel to the substrate across the cross-section. In the direction of application the extent of the adhesive can be less than said diameter of the bead. An extent in the direction of application corresponding to the diameter of the bead (application in the form of dots or spheres) or corresponding to a multiple of the diameter (adhesive strand) is also conceivable. It is moreover also conceivable for the bead to have a cavity, in other words a cavity that is enclosed by adhesive at least in some regions, or for the adhesive to overlap itself in places, in other words for the bead to be folded.

The present invention thirdly relates to a method for producing a heat-curable one-component adhesive, wherein components A and B of a two-component agent according to the invention are mixed together and pre-cured at a temperature in the range from 5° C. to 100° C.

All that has been stated in respect of the two-component agents according to the invention applies with the necessary alterations to the details of the preferred constituents of components A and B.

All that has been stated in respect of the heat-curable one-component adhesive according to the invention applies with the necessary alterations to the details of mixing and pre-curing.

The present invention fourthly provides a vehicle or subassembly consisting of at least two constituents, which have been bonded together by means of a heat-curable one-component adhesive according to the invention.

The present invention is distinguished by its applicability to a large number of materials. Although the adhesive bonding of metallic subassemblies, such as for example steel, aluminum optionally with the addition of scandium, or titanium, is preferred according to the invention, subassemblies made from wood, ceramics, plastics, fiber composite materials, such as carbon fiber-reinforced plastics or aramid fiber-reinforced plastics, or ferrites can of course also be bonded together by means of the adhesive agent according to the invention. Although it is conceivable in principle for the parts to be joined to consist of the same material, very good results are also achieved in the context of the present invention with the adhesive bonding of subassemblies made from differing materials.

All that has been stated in respect of the other subject matters of the present invention applies with necessary alterations to the details of this subject matter.

In the context of this subject matter of the present invention it has proved substantial that the heat-curable one-component adhesive already exhibits an initial adhesion after pre-curing, so that a cohesion between the subassemblies is already assured. It has proved advantageous according to the invention that after pre-curing, the use of further mechanical fixings on the subassemblies to be joined, such as for example a screw clamp or spot welds, can be dispensed with.

The present invention fifthly provides a method for joining at least two constituents of a vehicle or subassembly, wherein (a) components A and B of an agent of a two-component agent according to the invention are mixed together immediately before application,
(b) the resulting application preparation is applied to the bonding surface of at least one of the constituents to be joined and is pre-cured there at a temperature from 5° C. to 100° C.,
(c) then final curing of the application preparation is performed at temperatures from 120° to 240° C., wherein the bonding surfaces of the constituents to be joined being brought into contact with the adhesive in the joining position before or after pre-curing of the application preparation in step (b).

All that has been stated in respect of the other subject matters of the present invention applies with necessary alterations to the details of this subject matter.

According to the invention "joining position" is understood to mean the geometrical alignment of the constituents of the vehicle and/or subassembly and of the adhesive, said alignment determining the position in which the parts must be after final curing in order to fulfill their intended function.

In a first preferred embodiment of this subject matter according to the invention it has proved advantageous for the bonding surfaces of the constituents to be joined to be brought into contact with the adhesive in the joining position before pre-curing of the application preparation in step (b) and for the pre-cured adhesive to bond the subassemblies together after step (b).

It is substantial to the invention that the heat-curable one-component adhesive already exhibits an initial adhesion after pre-curing, so that a cohesion between the subassemblies is already assured. It has proved advantageous according to the invention that after pre-curing, the use of further mechanical fixings on the subassemblies to be joined, such as for example a screw clamp or spot welds, can be dispensed with.

In a second preferred embodiment of this subject matter according to the invention it has proved advantageous for the bonding surfaces of the constituents to be joined to be brought into contact with the adhesive in the joining position only immediately before process step (c).

According to the invention "immediately before process step (c)" is preferably understood to mean that a period of less than 1 day, preferably from 0.01 seconds to 180 minutes, elapses between the bringing into contact of the constituents to be joined and process step (c).

In this embodiment the resulting application preparation is first applied in step (b) only to the bonding surface of one of the constituents to be joined and is pre-cured there. This step does not have to be performed as part of the final manufacture of the resulting vehicle or subassembly; instead it can be performed during the parts production process, by a supplier for example.

It has proved advantageous if in this embodiment the pre-cured adhesive preparation exhibits little or no adhesion below 45° C., so that the coated subassemblies can be stacked, stored and transported without difficulty.

It is therefore preferable according to the invention for the constituents to be joined to be stored for a discretionary period after step (b) and optionally transported.

According to the invention the period of time between application steps (b) and (c) can preferably be a few minutes to several months, for example 1 minute to 6 months.

Regardless of the time at which the constituents to be joined are brought into contact with the adhesive agent in the final joining position, final curing takes place by heating the bonding region to temperatures from 120° C. to 240° C. This can take place in a separate manufacturing step; however, it has proved advantageous if final curing can be integrated into a manufacturing step for the vehicle or subassembly, such as powder coating for example.

The present invention sixthly provides the use of a polymer network formed in situ on the basis of reactive cyanate resins, in particular a polyurethane network formed in situ, as a toughener in heat-curable one-component epoxy adhesives.

It is particularly preferable according to the invention if the polymer network formed in situ on the basis of reactive cyanate resins can be obtained by mixing components A and B of the two-component agents according to the invention and pre-curing at a temperature from 5° C. to 100° C. Such networks that are obtained immediately in this way are most particularly preferred according to the invention.

All that has been stated in respect of the other subject matters of the present invention applies with necessary alterations to the details of this subject matter.

EMBODIMENT EXAMPLES

Unless otherwise specified, the quantities given in the examples are percentages by weight, relative to the component in question.

1 Formulations

|  | Example I* | Example II | Example III | Example IV* | Example V* | Example VI* | Example VII |
|---|---|---|---|---|---|---|---|
| Component A | | | | | | | |
| Epon ® 828 | 0.0 | 65.0 | 35.0 | 70.0 | 70.0 | 0.0 | 95.3 |
| Kane Ace ® MX-153 | 0.0 | 0.0 | 30.0 | 30.0 | 30.0 | 0.0 | 0.0 |
| Desmodur ® XP2599 | 0.0 | 35.0 | 35.0 | 0.0 | 0.0 | 0.0 | 0.0 |
| Desmodur ® VL R10 | 0.0 | 0.0 | 0.0 | 0.0 | 0.0 | 0.0 | 4.7 |
| Component B | | | | | | | |
| Epon ® 828 | 88.1 | 76.9 | 77.8 | 79.0 | 43.0 | 70.0 | 46.6 |
| PEG 200 | 0.0 | 5.0 | 5.0 | 0.0 | 0.0 | 0.0 | 0.0 |
| Terathane ® 2000 | 0.0 | 0.0 | 0.0 | 0.0 | 0.0 | 0.0 | 35.3 |
| Flexibilizer ® DY965 | 0.0 | 0.0 | 0.0 | 0.0 | 40.0 | 20.0 | 0.0 |
| Ajicure ® PN50 | 2.0 | 2.0 | 2.0 | 2.0 | 2.0 | 2.0 | 2.0 |
| Dicyandiamide | 9.9 | 15.9 | 15.0 | 19.0 | 15.0 | 8.0 | 15.9 |
| Dibutyl tin laurate | 0.0 | 0.2 | 0.2 | 0.0 | 0.0 | 0.0 | 0.2 |
| Mixing ratio A:B [parts by weight] | — | 1:1 | 1:1 | 1:1 | 1:1 | — | 1:1 |
| Content of PU toughener [wt. % of final preparation] | 0 | 20 | 20 | 0 | 20 | 20 | 20 |
| Characteristic values | | | | | | | |
| Modulus of elasticity after final curing [MPa] | 3300 | 2200 | 1800 | 2700 | 1850 | 1850 | n. d. |
| Ultimate elongation after final curing [%] | 5.0 | 10.1 | 35 | 3.7 | 6.4 | 8.3 | n.d. |

-continued

| | Example I* | Example II | Example III | Example IV* | Example V* | Example VI* | Example VII |
|---|---|---|---|---|---|---|---|
| Impact peel strength after final curing, 22° C. [N/mm] | 3.4 | 24 | 25.5 | 6.2 | 45.5 | 27.5 | 27.8 |

2 Production of the Preparations

The constituents of components A and B as listed above were mixed together in each case at 23° C. in a planetary mixer. After production, components A and B were introduced into sealed containers and stored at 22° C. Mixing of components A and B took place in a separate container in each case at 22° C. in the aforementioned mixing ratios. Examples I, IV, V and VI marked by an asterisk are not according to the invention.

3 Production and Measurement of Specimens 3.1 Modulus of Elasticity/Ultimate Elongation The modulus of elasticity and the ultimate elongation of the individual example recipes were determined using "dog bone" specimens in accordance with DIN EN ISO 527-1/-2 with type 5A specimens. To produce the necessary substance specimens, components A and B were mixed together and then introduced into a mold having a square base and a height of 2 mm, ensuring freedom from air bubbles and inclusions.

All specimens were heated in the mold for 20 min at 80° C., the pre-curing reaction taking place in the mixtures according to the invention of Examples II, III and VII.

After this pre-curing/storage, the individual materials were finally cured in the described mold for 30 min at 180° C. in an autoclave. The 2 mm thick sheets of completely cured materials thus obtained were removed from the mold and the type 5A specimens required for measurement were cut out. After conditioning the specimens for at least 24 h at 22° C. the modulus of elasticity and the ultimate elongation were determined in accordance with DIN EN ISO 527-1/-2.

3.2 Impact Peel Strength

In order to produce the specimens for measuring the impact peel strength, components A and B were mixed together and then applied in each case to one of the parts to be joined (ungalvanized steel (grade: DC06, CRS) with a coating thickness of 0.8 mm), which had previously been sand-blasted and then cleaned with ethyl acetate, and spread across the entire surface to be bonded. Then the adhesive layer was covered with a second part treated in the same way and the specimen was assembled. To establish the adhesive layer thickness of 0.2 mm, small amounts of glass beads with a diameter of 0.2 mm were placed on the material before positioning the second part to be joined. The assembled specimens were secured with clamps. The specimens to which the adhesive had been applied were stored in a heating cabinet at 80° C. for 20 min; during this time pre-curing occurred in the specimens of Examples II, III and VII. Final curing then took place in an analogous manner in a heating cabinet at 180° C. for 30 min. Following final curing the specimens were conditioned for 24 h at 22° C. and then used to determine the impact peel strength.

4 List of Raw Materials Used:

Ajicure® PN50 Amine adduct with epoxide resin; latent hardener and accelerator for epoxide resins; manufactured by Ajinomoto Desmodur® VL R10 Aromatic polyisocyanate based on diphenylmethane diisocyanate, equivalent weight 133 g/eq, manufactured by Bayer Desmodur® XP2599 Aliphatic polyisocyanate prepolymer, liquid at room temperature; manufactured by Bayer Epon® 828 Reaction product of epichlorohydrin with bisphenol A; liquid at room temperature; EEW 184-190 g/eq; manufactured by Hexion Flexibilizer® DY965 Polyurethane polyol with less than 14 wt. % of 4,4'-(1-methylethylidene)bis[2-(2-propen-1-yl) phenol]; impact modifier; manufactured by Huntsman Kane Ace® MX-153 Mixture of epoxide resin based on bisphenol A (EEW approx. 270 g/eq) and approx. 33 wt. % of core-shell rubber (butadiene-acrylic copolymer)

Terathane® 2000 Polytetrahydrofuran, melting point 26-30° C.; manufactured by Invista 5 Summary The measured values clearly show that preparations II and III according to the invention, in which the polyurethane was formed in situ, have a lower modulus of elasticity but a markedly higher tensile strain in comparison to the unmodified system from Example I. These specimens are thus markedly more compliant than the comparative specimens from Example I.

Example III further shows that the positive influence exerted on the ultimate elongation by the polyurethane network formed in situ can be further improved by the combination with core-shell rubber particles in comparison to mixtures II and IV, each of which contains only one of the components. The comparison of tensile strain in Examples II and III (PU formed in situ) with that in Examples V and VI (conventional impact modifiers) shows that the polyurethane network formed in situ also results in a markedly higher ultimate elongation in comparison to conventional impact-modified mixtures.

The modulus of elasticity determined in Examples II and III is comparable with the moduli of elasticity found in the conventionally impact-modified Examples V and VI.

Furthermore, the specimens of Examples II, III and VII produced according to the invention are distinguished by a greater impact peel strength at room temperature than the comparative specimens from Example I. The impact peel strength can be increased both by the sole use of the polyurethane formed in situ (Examples II and VII) and by the combination thereof with core-shell rubber particles (Example III), but not by the sole use of core-shell rubber particles (Example IV). The comparison of Examples II, VI and VII also shows that the results obtained for impact peel strength with the sole use of the polyurethane network formed in situ (Examples II and VII) are comparable to those obtained with the sole use of a conventional impact modifier (Example VI).

What is claimed is:

1. An agent for producing an impact-modified epoxy adhesive comprising at least two components A and B packaged separately from each other wherein:

Component A comprises:
(a1) at least one compound having two or more isocyanate groups; and
(a2) at least one epoxide prepolymer, which is a liquid at 22° C., wherein (a2) comprises from 25 to 75 wt. % of Component A, and Component B comprises
(b1) at least one compound which has at least two reactive groups selected from hydroxyl groups and thiol groups, and is simultaneously free from epoxy groups;
(b2) at least one epoxide prepolymer that is a liquid at 22° C., wherein (b2) comprises from 30 to 95 wt. % of Component B, which may be the same as or different from (a2),
(b3) at least one latent hardener for epoxide prepolymers, and
(b4) a curing catalyst for isocyanates;

wherein the agent has a higher proportion by weight of epoxide prepolymers than of components involved in a pre-curing reaction of the two or more isocyanate groups with the at least two reactive groups selected from hydroxyl groups and thiol groups.

2. The agent according to claim 1, wherein the at least one compound which has at least two reactive groups selected from hydroxyl groups and thiol groups, and is simultaneously free from epoxy groups has a polyether structure or is selected from alkyl diols.

3. The agent according to claim 1, wherein the at least one compound which has at least two reactive groups selected from hydroxyl groups and thiol groups, and is simultaneously free from epoxy groups is a polyol.

4. The agent according to claim 1, wherein the at least one compound having two or more isocyanate groups has a polyether structure.

5. The agent according to claim 1, wherein at least one of component A or component B is additionally comprised of at least one toughener.

6. The agent according to claim 1, wherein component A comprises at least one drying agent.

7. A method for producing a heat-curable one-component adhesive, comprising:
a) mixing components A and B of the agent according to claim 1 to form a mixture, and
b) pre-curing the mixture at a temperature in a range from 5° C. to 100° C.

8. A method for joining at least two constituents of a vehicle or subassembly comprising:
(a) mixing together, immediately before application, components A and B of the agent according to claim 1 to form an application preparation;
(b) applying the application preparation to one or more bonding surfaces of at least one of the constituents to be joined and precuring the application preparation at a temperature from 5° C. to 100° C.,
(c) then final curing of the application preparation is performed at temperatures from 120° to 240° C.,
wherein the bonding surfaces of the constituents to be joined being brought into contact with the application preparation in a joining position before or after pre-curing of the application preparation in step (b).

9. The method according to claim 8, wherein the bonding surfaces of the constituents to be joined are:
1) brought into contact with the application preparation in the joining position before pre-curing of the application preparation in step (b) and the pre-cured application preparation bonds the constituents together after step (b); or
2) brought into contact with the application preparation in the joining position only immediately before process step (c).

10. The method according to claim 8, wherein the constituents to be joined are stored for a discretionary period after step (b) and optionally transported.

11. The method according to claim 8, wherein a period ranging from one minute to six months elapses between application steps (b) and (c).

12. The agent according to claim 1, wherein components A and B of the agent are capable of forming a polyurethane polymer network in situ, before final curing, when mixed together and pre-cured at a temperature from 5° C. to 100° C.

13. The agent according to claim 1, wherein (a1) is selected from aliphatic polyisocyanate prepolymers, 2,2'-diphenylmethane diisocyanate, 2,4-diphenylmethane diisocyanate, 4,4'-diphenylmethane diisocyanate, polymeric MDI and mixtures thereof, having a molecular weight average of more than 150 g/mol and less than 5000 g/mol and (b1) is selected from polyols, diols and mixtures thereof, having a molecular weight average of at least 60 g/mol and less than 4000 g/mol.

14. The agent according to claim 1, wherein the agent comprises the epoxide prepolymers in an amount from 20 to 90 wt. %, relative to Components A and B.

15. The agent according to claim 1, wherein the agent comprises the epoxide prepolymers in an amount from 40 to 80 wt. %, relative to Components A and B.

16. The agent according to claim 1, wherein (a1) is present in an amount of 4.7 to 35 wt. %, relative to Component A; and (b1) is present in an amount of 5 to 35.3 wt. %; relative to Component B.

17. The agent according to claim 1, wherein the agent further comprises rubber particles having a core-shell structure; and component A and component B each have a viscosity in a range of 0.01 to 1000 Pa*s at a temperature of at most 100° C.

18. The agent according to claim 1, wherein the one or more epoxide prepolymers is present in an amount of 50-85 wt. %, relative to the total amount of component B; and the at least one compound which has at least two reactive groups selected from hydroxyl groups and thiol groups, and is simultaneously free from epoxy groups is present in an amount of 5 to 35.3 wt. %, relative to the total amount of component B.

19. The agent according to claim 1, wherein the at least one compound having two or more isocyanate groups is present in an amount of 4.7 to 35 wt. %, relative to Component A.

20. An agent for producing an impact-modified epoxy adhesive comprising at least two components A and B packaged separately from each other and to be combined in a mixing ratio of 4:1 to 1:4 parts by weight, wherein:
Component A comprises:
(a1) 5 to 50 wt. %, based on the total agent, of at least one polyisocyanate having an isocyanate equivalent weight of from 125 g/eq to 1000 g/eq selected from the group consisting of aliphatic polyisocyanate prepolymers and aromatic polyisocyanates; and
(a2) at least one epoxide prepolymer, which is a diglycidyl ether of bisphenol A and is a liquid at 22° C., wherein (a2) comprises from 25 to 75 wt. % of Component A, and Component B comprises
- (b1) 1.5 to 35 wt. %, based on the total agent, of at least one compound which has at least two reactive hydroxyl groups selected from the group consisting of polyethylene glycols, polypropylene glycols, and polytetrahydrofurans, has a molecular weight average of at least 90 g/mol and less than 4000 g/mol and is simultaneously free from epoxy groups;
- (b2) at least one epoxide prepolymer that is a diglycidyl ether of bisphenol A and is a liquid at 22° C., which may be the same as or different from (a2), wherein (a2) and (b2) together comprise from 40 to 80 wt. % of the total weight of the agent and wherein (b2) comprises from 30 to 95 wt. % of Component B,
- (b3) 3 to 10 wt %, based on the total agent, of at least one latent hardener for epoxide prepolymers selected from the group consisting of substituted guanidines,
- (b4) 0.1 to 2 wt. %, based on the total agent, of at least one curing accelerator for epoxide prepolymers selected from the group consisting of adducts of amino compounds with epoxide resins, and
- (b5) 0.02 to 0.5 wt. %, based on the total agent, of a curing catalyst for isocyanates selected from the group consisting of dialkyl tin dicarboxylates;

wherein the agent has a higher proportion by weight of epoxide prepolymers than of components involved in a pre-curing reaction of the polyisocyanate with the compound having at least two reactive hydroxyl groups.

21. The agent according to claim 20, wherein Component A additionally comprises up to 35 wt. % of at least one toughener comprised of rubber particles having a core-shell structure with a core made from a polymer material having a glass transition temperature of less than 0° C. and a shell made from a polymer material having a glass transition temperature of greater than 25° C.

* * * * *

UNITED STATES PATENT AND TRADEMARK OFFICE
CERTIFICATE OF CORRECTION

PATENT NO. : 9,828,534 B2
APPLICATION NO. : 14/051509
DATED : November 28, 2017
INVENTOR(S) : Martin Renkel et al.

It is certified that error appears in the above-identified patent and that said Letters Patent is hereby corrected as shown below:

In the Specification

Column 3, Line 21: Change "(HU)" to -- HDI --.

Column 5, Line 48: Change "dials" to -- diols --.

Column 5, Line 59: Change "dials" to -- diols --.

Column 5, Line 62: Change "dials" to -- diols --.

Column 6, Line 23: Change "dials" to -- diols --.

Column 9, Line 4: Change "400g/eq" to -- $\geq$ 400g/eq --.

Column 13, Line 60: Change "11e" to -- lie --.

Column 14, Line 15: Change "add" to -- acid --.

Signed and Sealed this
Twenty-first Day of August, 2018

Andrei Iancu
*Director of the United States Patent and Trademark Office*